(12) United States Patent
Ketcham

(10) Patent No.: US 7,314,104 B2
(45) Date of Patent: Jan. 1, 2008

(54) STEAM DRIVEN ROAD VEHICLE

(76) Inventor: John C. Ketcham, 4 White Oak, Elon, NC (US) 27244

( * ) Notice: Subject to any disclaimer, the term of this patent is extended or adjusted under 35 U.S.C. 154(b) by 369 days.

(21) Appl. No.: 11/021,196

(22) Filed: Dec. 24, 2004

(65) Prior Publication Data

US 2006/0137922 A1    Jun. 29, 2006

(51) Int. Cl.
*B60K 3/00*    (2006.01)
(52) U.S. Cl. .................... 180/65.2; 180/302; 180/310
(58) Field of Classification Search ............... 180/65.2, 180/302, 310
See application file for complete search history.

(56) References Cited

U.S. PATENT DOCUMENTS

| | | | | |
|---|---|---|---|---|
| 682,194 | A | | 9/1901 | Hess |
| 1,498,329 | A | * | 6/1924 | Sokolowski ................ 392/467 |
| 1,751,734 | A | | 3/1930 | Harris |
| 2,007,034 | A | * | 7/1935 | Bidwell ....................... 392/401 |
| 3,657,696 | A | * | 4/1972 | Lessard et al. ............ 290/38 C |
| 3,672,048 | A | | 6/1972 | Conwell ...................... 180/67 |
| 3,673,379 | A | * | 6/1972 | Eversull ...................... 219/202 |
| 3,778,578 | A | * | 12/1973 | Long et al. ................ 219/687 |
| 3,878,680 | A | * | 4/1975 | Dauvergne .................... 60/511 |
| 3,878,913 | A | | 4/1975 | Lionts et al. ................. 180/65 |
| 3,904,883 | A | | 9/1975 | Horwinski ..................... 290/50 |
| 3,942,719 | A | | 3/1976 | Blomberg .................. 237/12.3 |
| 3,971,454 | A | | 7/1976 | Waterbury ..................... 180/65 |
| 4,007,594 | A | | 2/1977 | Elsea, Jr. ...................... 60/618 |
| 4,023,367 | A | | 5/1977 | Izumi ........................... 60/693 |
| 4,094,377 | A | | 6/1978 | Biggs ........................... 180/65 |
| 4,133,403 | A | | 1/1979 | Priddy, Jr., et al. ........... 180/65 |
| 4,238,643 | A | | 12/1980 | Johnston ....................... 179/39 |
| 4,288,674 | A | | 9/1981 | Councell ................. 219/10.55 |
| 4,294,075 | A | | 10/1981 | Closs ........................... 60/671 |
| 4,326,598 | A | | 4/1982 | Acker ......................... 180/304 |
| 4,366,357 | A | | 12/1982 | Satoh ....................... 219/10.55 |
| 4,394,582 | A | | 7/1983 | Kreissl et al. ................. 290/4 |
| 4,429,203 | A | | 1/1984 | Ramer ..................... 219/10.55 |
| 4,476,817 | A | | 10/1984 | Lindberg ........................ 123/3 |
| 4,751,359 | A | | 6/1988 | Jamieson ................. 219/10.55 |
| 5,092,127 | A | | 3/1992 | Miller ........................... 60/668 |
| 5,191,766 | A | | 3/1993 | Vines ........................... 60/619 |
| 5,385,211 | A | * | 1/1995 | Carroll ....................... 180/65.2 |
| 5,385,214 | A | * | 1/1995 | Spurgeon ..................... 180/304 |
| 5,417,941 | A | | 5/1995 | McNulty ..................... 422/307 |
| 5,687,674 | A | * | 11/1997 | Johanntgen et al. ........ 122/1 A |
| 5,708,306 | A | | 1/1998 | Lin ........................... 307/10.1 |
| 5,750,967 | A | | 5/1998 | Sprauer, Jr. ................. 219/735 |
| 5,896,746 | A | | 4/1999 | Platell .......................... 60/620 |
| 5,899,072 | A | | 5/1999 | Gode ........................... 60/670 |
| 6,040,564 | A | | 3/2000 | Ueda et al. ................. 219/682 |

(Continued)

*Primary Examiner*—Christopher P. Ellis
*Assistant Examiner*—John R. Olszewski

(57) ABSTRACT

A steam driven road vehicle having a firebox, a boiler, a drive mechanism operated by steam from the boiler, a water supply supplying water to the boiler, and a drive connection connected between the drive mechanism and an axle of the vehicle. A fuel bin is supported by the vehicle frame holds a supply of fuel to be fed to the firebox. A power driven conveyor conveys fuel from the fuel bin to the firebox. An electrical system is made up of a plug-in element which connects with an electric source, and a preheating element on the boiler for producing preheat in the boiler. A heat control device controls the temperature of the output of the preheating element, and a time control device is arranged to energize the preheating element prior to driving the vehicle.

14 Claims, 2 Drawing Sheets

30 Water Tank  32 Fuel Tank  34 Batteries  36 First Switch
38 First Pump  40 Flash Boiler  42 Microwave  44 Heating Coils
46 Combustion Boiler  48 Motor  50 Condenser  52 Battery Charger
54 Second Switch  56 Second Pump  58 Ignition  60 Water Float Valve
62 Fuel Float Valve  63 Condenser Float Valve  64 Third Pump

U.S. PATENT DOCUMENTS

| | | | |
|---|---|---|---|
| 6,064,047 A | 5/2000 | Izzo | 219/688 |
| 6,133,558 A | 10/2000 | Ueda et al. | 219/682 |
| 6,397,962 B1 * | 6/2002 | Bllau | 180/65.2 |
| 6,437,304 B2 | 8/2002 | Ushijima et al. | 219/688 |
| 6,450,283 B1 | 9/2002 | Taggett | 180/304 |
| 6,533,539 B1 | 3/2003 | Johnson | 415/80 |
| 6,646,241 B1 | 11/2003 | Varma et al. | 219/679 |
| 6,854,273 B1 * | 2/2005 | Lasley et al. | 60/646 |
| 7,104,348 B2 * | 9/2006 | Fasanello, Jr. | 180/65.2 |
| 2002/0153178 A1 * | 10/2002 | Limonius | 180/2.2 |

\* cited by examiner

TOP VIEW OF VEHICLE

A HEATING COILS
B WATER PUMP
C CONDENSER

A  Misting Valve
B  Burners

30 Water Tank    32 Fuel Tank    34 Batteries    36 First Switch
38 First Pump    40 Flash Boiler    42 Microwave    44 Heating Coils
46 Combustion Boiler    48 Motor    50 Condenser    52 Battery Charger
54 Second Switch    56 Second Pump    58 Ignition    60 Water Float Valve
62 Fuel Float Valve    63 Condenser Float Valve    64 Third Pump

STEAM DRIVEN ROAD VEHICLE

BACKGROUND OF THE INVENTION

1. Field of the Invention

The present invention relates to steam driven road vehicles and more particularly to a steam driven automobile utilizing microwave heating means.

2. Description of the Prior Art

A steam driven automobile was first developed in the early 1900's and made popular at that time by the Stanley brothers who produced and sold the Stanley Steamer. Others improved the technology and the product was quiet and powerful. Since the automobile could go up to 120 miles per hour, many thought that this would be the automobile of the future. Then the internal combustion engine was developed which could be started in a fraction of the time it took to fire up a steam car. Thus the steam car was abandoned and the internal combustion engine became the backbone of the automobile industry.

Steam was ultimately made the power supply of choice in the locomotive industry where the starting time was mainly irrelevant. Abner Doble developed the E Series Doble Steamer, and he claimed his car would start in 23 seconds and could achieve 40 miles per hour 13 seconds later. The Paxton Company continued to work on team locomotion into the 1950's but probably never produced a car for sale.

DETAILED DESCRIPTION OF THE PREFERRED EMBODIMENT

Figure 1:
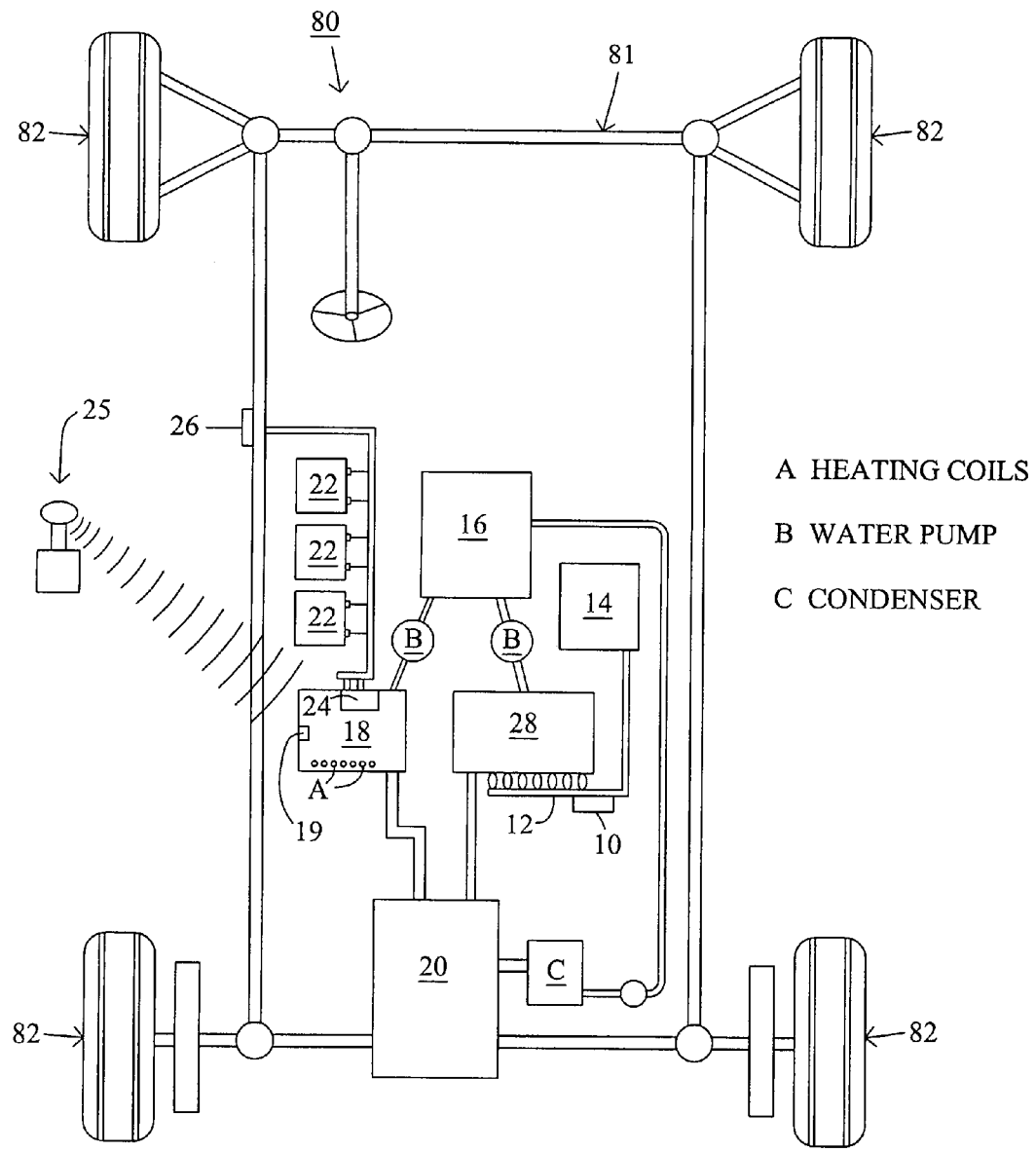
FIG. 1 is a plan schematic view of the fundamental structure and components of the present invention.

FIG. 1 schematically shows the basic chassis including frame 81 and four (4) wheels 82 of an automobile vehicle 80 incorporating the present inventive features including an igniter 10, a combustion chamber 12, a diesel fuel tank 14, a water reservoir 16, two (2) water pumps B, B, a flash boiler 18, a steam engine 20, and a combustion boiler 28.

The electrical portion of the invention includes a bank of batteries 22, a microwave unit 24, heating coils A and battery recharging plug 26. Batteries 22 provide power to microwave unit 24 and heating coils A to heat flash boiler 18. Electricity is generated by wheel's rotation, the engine rotor and the braking process and directed to batteries 22 for storage. Battery recharging plug 26 is available for charging batteries 22 in the event on-board charging proves inadequate. Recharging plug 26 can be plugged into standard 220 volt AC.

Temperature sensing element 19 in flash boiler 18 controls microwave unit 24 so that when the car is not in use for a short period, the temperature is kept near the boiling point so the car can make an almost immediate start. A radio signal from transmitter 25 as depicted in FIG. 1 can turn on microwave unit 24 and thus shorten the time to bring the car to power after the driver is behind the wheel. Use of microwave unit 24 to provide heat for flash boiler 18 reduces the number of batteries 22 normally required for an electric vehicle since microwave unit 24 does not require a great deal of electrical power for the start.

Vehicle 80 has a secondary fuel source. Combustion boiler 28 is used for longer trips and is fired by diesel fuel. The movement of the car and braking action recharges batteries 22 thus permitting vehicle 80 to operate on short trips around town in the microwave mode which is a noiseless and decreased pollution mode. When using diesel fuel, it is possible to use bio-diesel fuel made largely from soybean oil which is very friendly to the environment. Bio-diesel fuel can be used alone or in combination with hydrocarbon diesel fuel which is in plentiful supply. The use of condenser C as seen in FIG. 1 will enable the recapture of water from steam thus reducing the need to carry large amounts of water.

Figure 2:
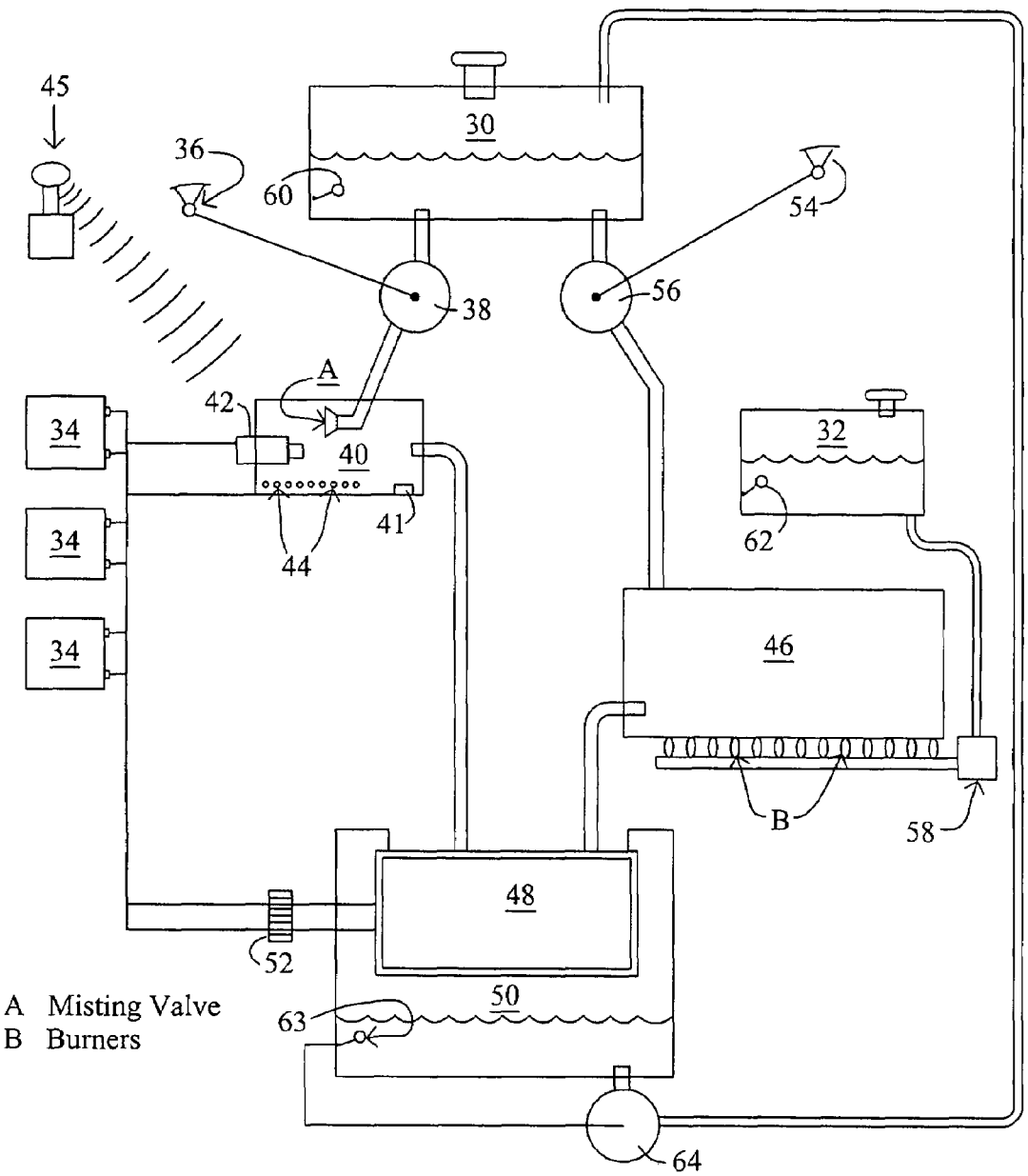
FIG. 2 is plan schematic view of another embodiment of the present invention.

FIG. 2 schematically shows another embodiment of a steam driven vehicle. Before the vehicle can be driven, water tank 30 must be filled, diesel fuel tank 32 must be filled, and batteries 34 must be charged.

First switch 36 operating first pump 38 that takes water to flash boiler 40 is turned on and microwave gun 42 and heating coils 44 are activated. Pressures in flash boiler 40 will reach 650 psi, and first pump 38 must be able to match that pressure. First pump 38 also acts as a block to keep boiler pressures from feeding back into water tank 30. Flash boiler 40 is the first power source to be activated, and it is this power that moves the vehicle on short trips. In this phase, combustion boiler 46 is inactive.

The combination of heating coils 44 and microwave gun 42 can bring the water in flash boiler 40 to steam in seconds. This can be assisted by a device such as transmitter 45 seen in FIG. 2 on the driver's key chain (not shown) that can emit a radio signal that will turn on the two heating sources before the driver enters the vehicle. Heating coils 44 will use more electricity than microwave gun 42. When operating pressures are reached, heating coils 44 are turned off to conserve power, and steam will then be made solely by microwave gun 42.

Steam at 650 psi drives a steam turbine or a steam piston engine, both designated as 48. Since water usage must be kept within reasonable grounds, condenser 50 has been designed to surround engine 48. As steam moves past the fins (not shown) of engine 48, the pressure on the other side of the fins lowers the efficiency of engine 48. Condenser 50 completely encapsulates engine 48 to help to increase efficiency. Reducing spent steam to water will create a partial vacuum on the spent steam side of engine 48 and the resulting lower pressure will allow the steam on the opposite side of the engine fins (not shown) to be more effective. By preventing steam from escaping condenser 50, water conservation is enhanced.

As engine 48 drives the vehicle, battery charger 52 is activated and batteries 34 are kept fully charged. This requires combustion boiler 46 to also be used.

For a longer trip or to keep batteries 34 charged, combustion boiler 46 is activated by switching on second pump 56 with second switch 54 which provides water to combustion boiler 46. Switching on igniter 58 will fire the flames that heat boiler 46. While boiler 46 is coming up to full pressure, flash boiler 40 continues to operate but is turned off once it is no longer needed. Respectively first and second pumps 38, 56 act as a safety precaution. If one pump goes out, or some other part of the system fails, the remaining system is capable of moving the vehicle.

Water float valve 60 in water tank 30 activates a gauge (not shown) that indicates low water. Fuel float valve 62 in diesel tank 32 does the same thing to indicate low fuel. Condenser float valve 63 in condenser 50 activates third pump 64 that takes water from condenser 50 to water tank 30.

Other techniques may be used to make microwave gun 42 more efficient. A steam turbine engine or a steam piston engine (either designated as 48) may be used as an effective motor power source.

When the automobile is using only flash boiler 40 and is powered only by electricity, it is in the most effective environmental mode. When engine 48 is using diesel fuel, it can also have a significant favorable environmental impact by using bio-diesel fuel. This also has the great advantage of not being dependent on foreign hydrocarbon fuel.

The steam car is a quiet vehicle and, as described, is simple enough to be easily repaired and is relatively inexpensive to manufacture. Since its operating pressures are at 650 psi or less and the fluid upon which these pressures are exerted is only water, the vehicle has safety features well beyond the hydrogen powered vehicles which involve compressing hydrogen to pressures up to 10,000 psi. The infrastructure required to support this mode of transportation is already in place. Bio-diesel fuel is interchangeable with hydrocarbon diesel, and the latter is already marketed on a broad basis. The hydrogen infrastructure is far more complex.

From the proceeding description, it can be seen that a steam driven automobile has been provided that will meet all of the advantages of prior art devices and offer additional advantages not heretofore available. With respect to the foregoing invention, the optimum dimensional relationship to the parts of the invention including variations in size, materials, shape, form, function and manner of operation, use and assembly are deemed readily apparent to those skilled in the art, and all equivalent relationships illustrated in the drawings and described in the specification are intended to be encompassed herein.

The foregoing is considered as illustrative only of the principles of the invention. Numerous modifications and changes will occur to those skilled in the art, and it is not desired to limit the invention to the exact construction and operation shown and described. All suitable modifications and equipments that fall within the scope of the appended claims are deemed within the present inventive concept.

What is claimed is:

1. A motor vehicle powered by electricity or combustion either singularly or in combination, the vehicle comprising: a flash boiler; a supply of water; battery means; a microwave unit; heating coils, said microwave unit and said heating coils being powered by said battery means to heat water in said flash boiler until a predetermined boiler pressure is achieved, a required level of steam is developed and said heating coils are deactivated; a condenser system, said condenser system converting spent steam into water and thereby lowering the quantity of water needed to be carried by the vehicle and temperature sensing elements, said temperature sensing elements indicating the temperature in said flash boiler and programmed to keep said microwave unit in an active state and maintaining the water temperature near boiling to reduce the time for restarting the vehicle after it has been temporarily parked.

2. The vehicle as claimed in claim 1 further comprising: means for activating said flash boiler before the driver enters the vehicle to initiate the generation of steam at a predetermined time before the vehicle is entered and started.

3. The vehicle as claimed in claim 1 wherein the water converted from the spent steam is returned to said water supply.

4. The vehicle as claimed in claim 2 wherein the water converted from the spent steam is returned to said water supply.

5. A vehicle comprising: a flash boiler, an engine, a combustion boiler, and a temperature sensing element, said flash boiler spaced from said combustion boiler, said flash boiler and said combustion boiler connected to said engine, said temperature sensing element for indicating the temperature in said flash boiler and programmed to maintain the water temperature in said flash boiler near boiling to reduce the restarting time of the vehicle after temporary parking.

6. The vehicle of claim 5 further comprising a means for activating said flash boiler for steam generation before the vehicle is entered and started.

7. The vehicle of claim 5 further comprising a pump, said pump connected to said flash boiler.

8. The vehicle of claim 7 further comprising a switch, said switch connected to said pump.

9. The vehicle of claim 5 wherein said flash boiler comprises a microwave unit.

10. The vehicle of claim 5 further comprising a condenser, said condenser connected to said engine.

11. The vehicle of claim 5 further comprising a water tank, water, said water tank containing said water, said water tank connected to said flash boiler.

12. The vehicle of claim 10 further comprising a fuel tank, said fuel tank connected to said combustion boiler.

13. The vehicle of claim 5 further comprising a frame, said engine attached to said frame.

14. The vehicle of claim 13 further comprising a wheel, said wheel attached to said frame.

* * * * *